July 31, 1934.　　　　L. W. BARNES　　　　1,968,550
RUBBER ROLLER GRINDING MACHINE
Filed May 28, 1930　　　5 Sheets-Sheet 2
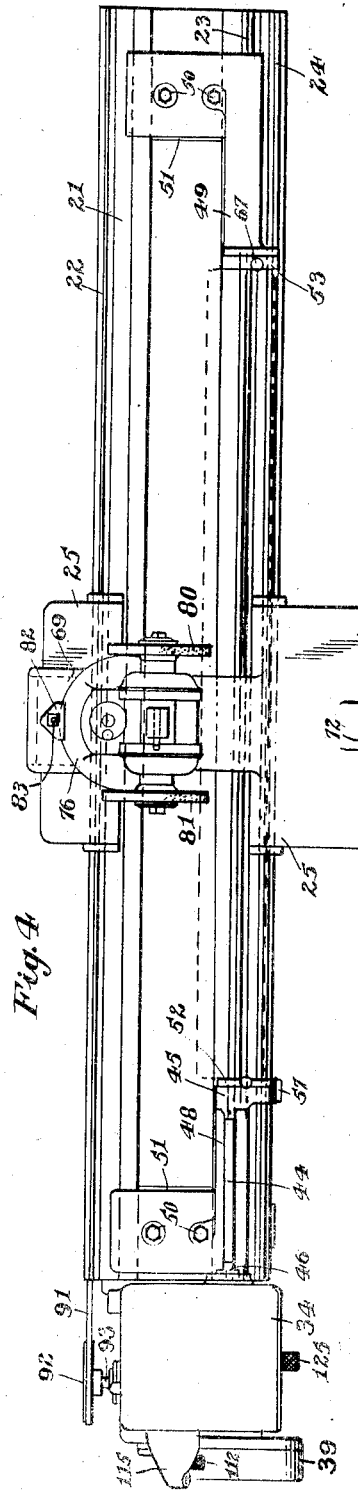
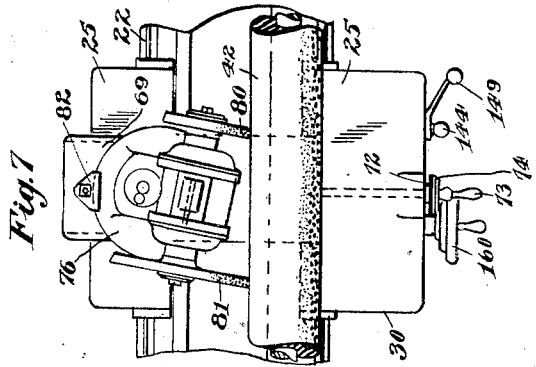
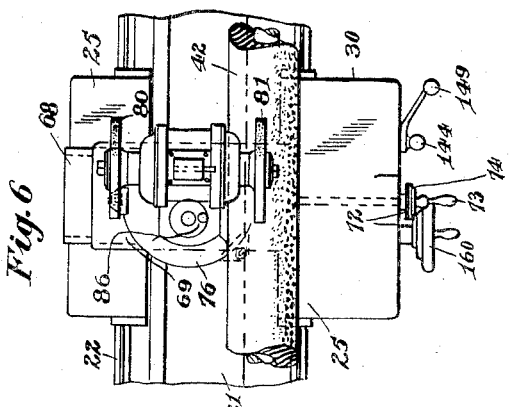
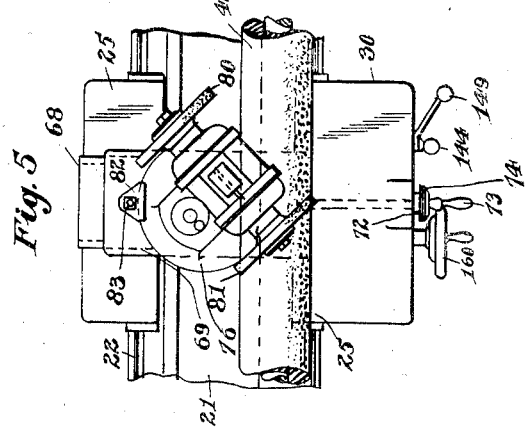
INVENTOR.
Leslie W. Barnes
BY
Chamberlain & Neuman
ATTORNEYS.

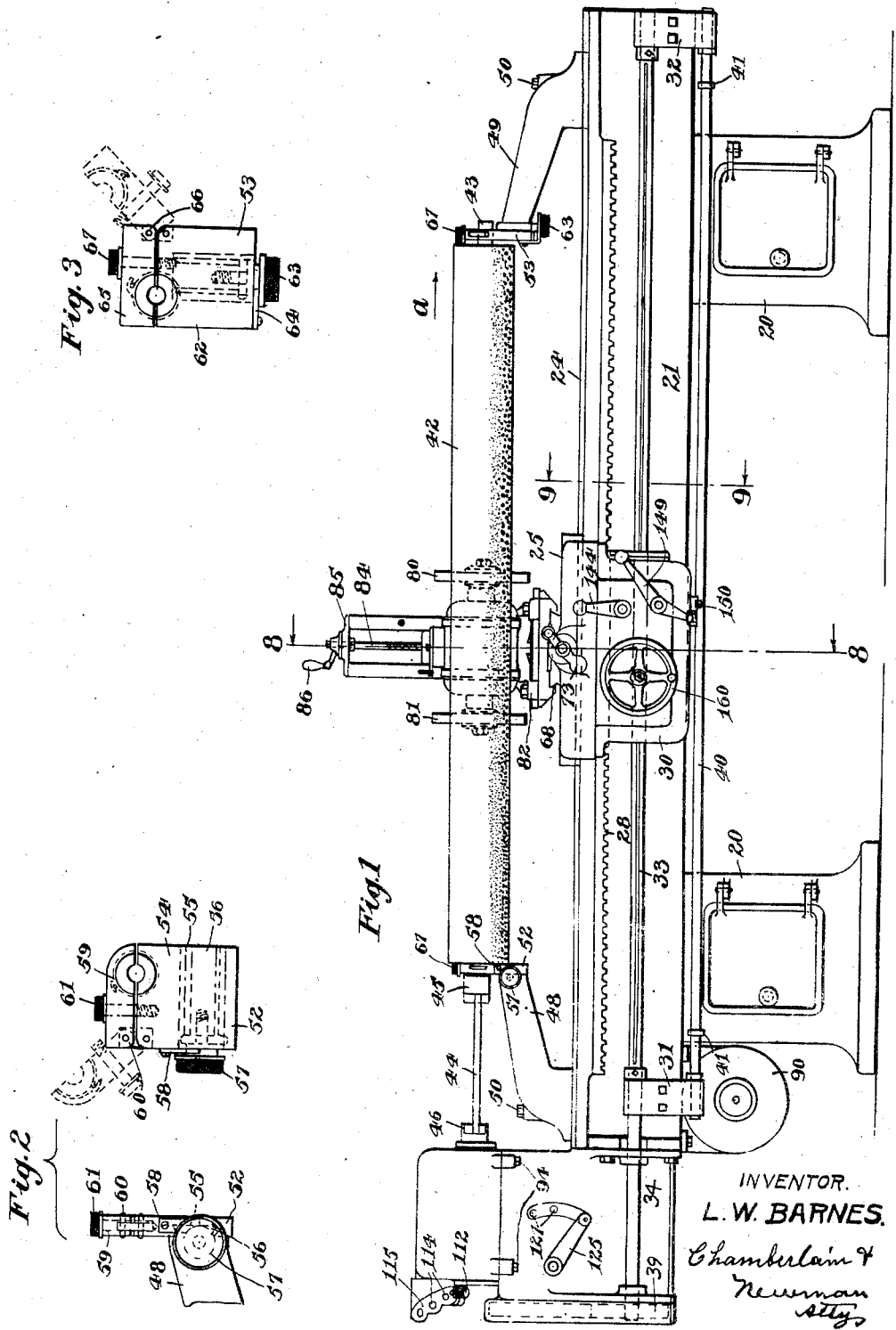

July 31, 1934.　　　L. W. BARNES　　　1,968,550
RUBBER ROLLER GRINDING MACHINE
Filed May 28, 1930　　5 Sheets-Sheet 3
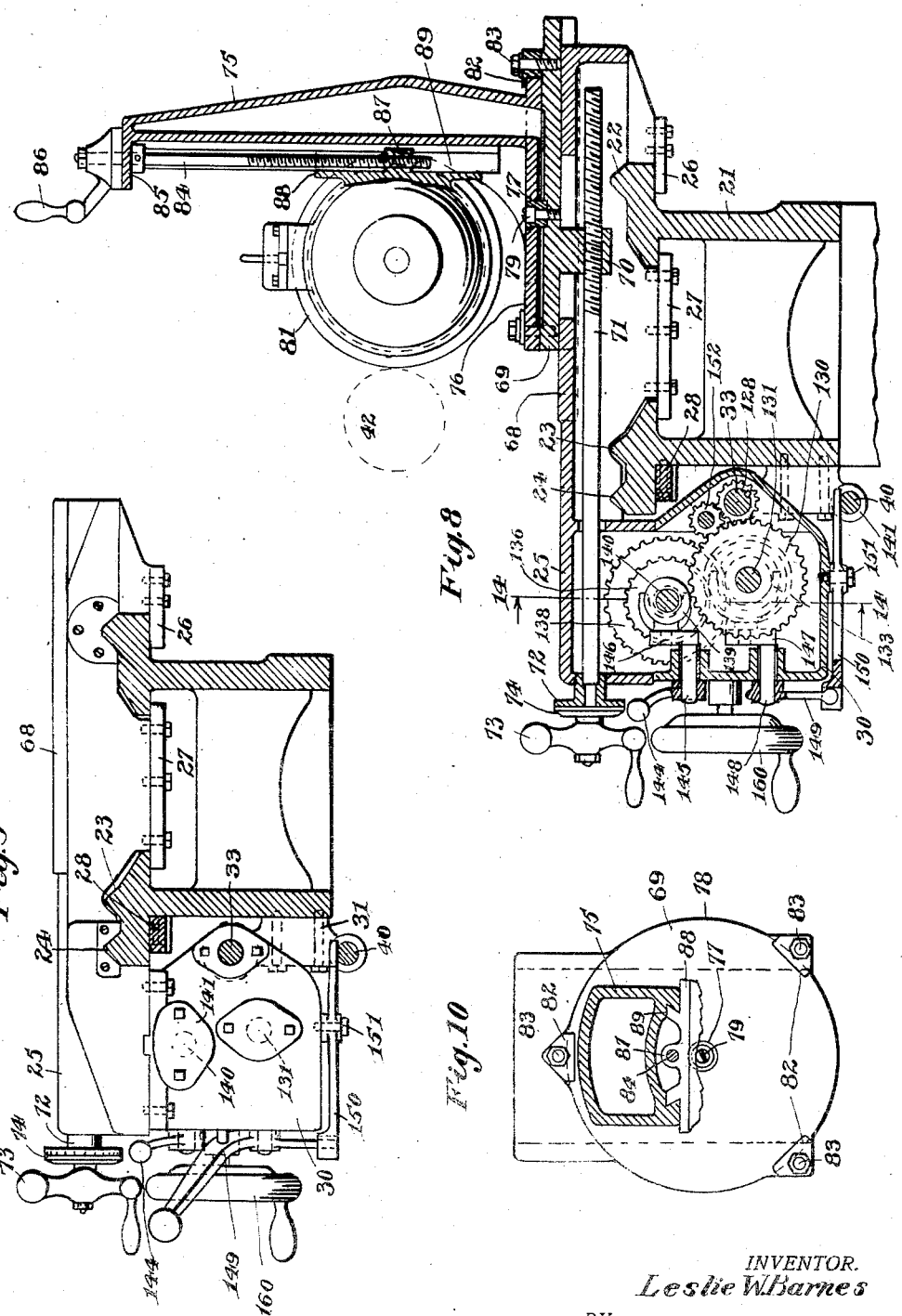
INVENTOR.
Leslie W. Barnes
BY
Chamberlain & Newman
ATTORNEYS.

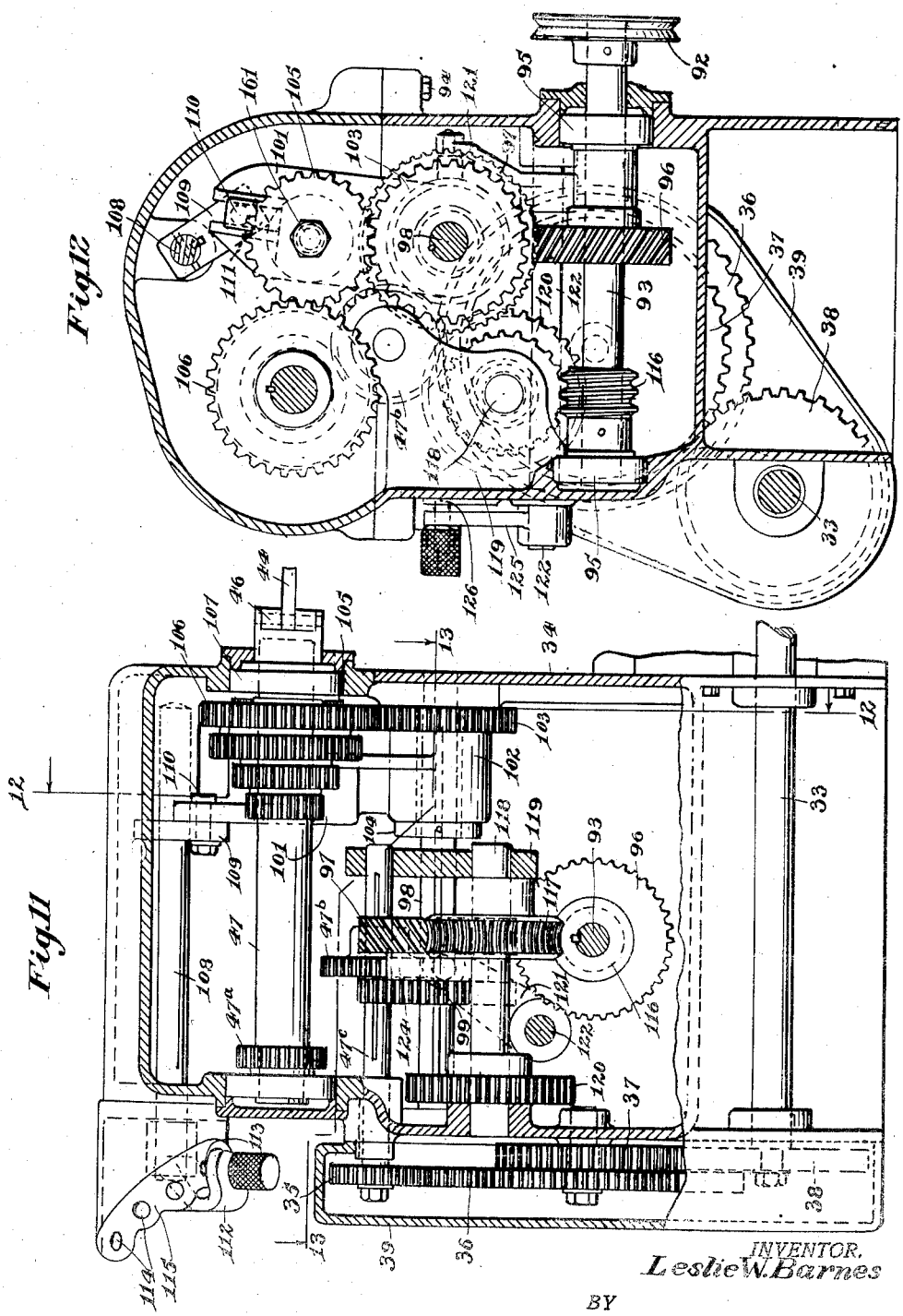

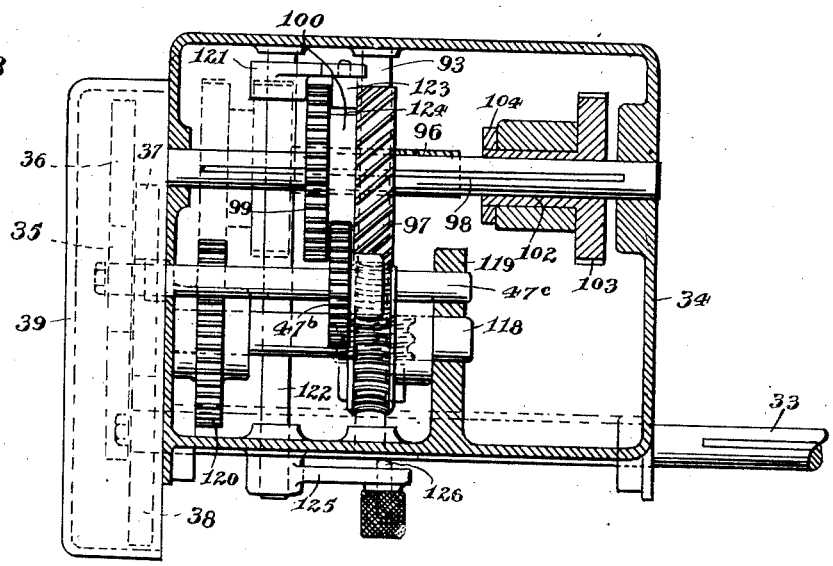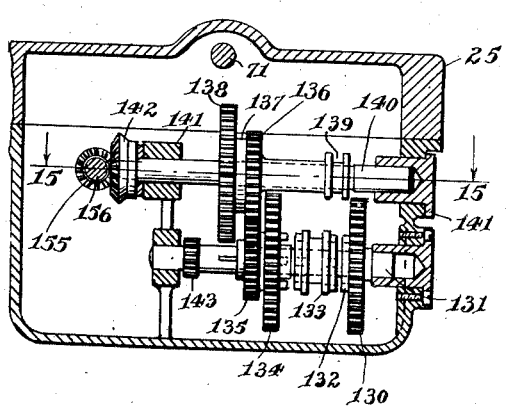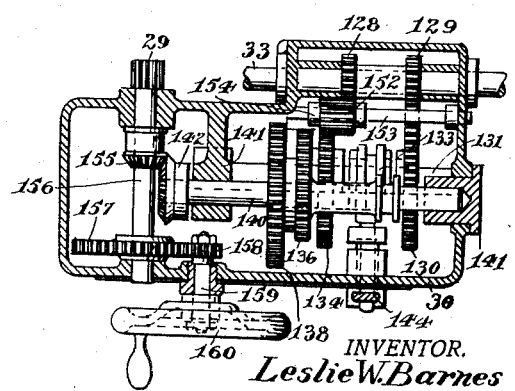

Patented July 31, 1934

1,968,550

UNITED STATES PATENT OFFICE 1,968,550

RUBBER ROLLER GRINDING MACHINE

Leslie W. Barnes, Trumbull, Conn., assignor to The Black Rock Manufacturing Company, Bridgeport, Conn., a corporation of Connecticut Application May 28, 1930, Serial No. 456,613

3 Claims. (Cl. 51—49)

This invention relates to new and useful improvements in rubber working machines and more particularly to a machine for grinding the surface of rubber rollers, as for instance those used in printing presses for distributing and applying the ink to the type.

Rollers of this type are built upon metal mandrels which may be of tubular or solid construction and of a length slightly longer than that of the roll formed upon it, so as to form trunnions at either end for the rotatable mounting of the roller. The rollers may otherwise be formed of relatively soft, high grade rubber or other material. The surface of these rollers must not only be originally ground to produce a perfectly smooth surface of uniform diameter but must be reground from time to time in order to properly refinish the surface by taking out all of the surface cavities, pockets, or indentations, and to reproduce a uniform diameter.

A smooth cylindrical surface on rollers for printing purposes must be maintained in order to avoid blots, creases and blurs on the printed sheets as they come from the press.

It is therefore the purpose of my invention to provide a machine for the above purpose, for grinding rollers to the required standard, to more perfectly grind rollers of the above classes than has heretofore been possible, and to accomplish the grinding operation in about one-third of the time heretofore required, to provide a grinding machine of this character which will be adapted to operate upon rollers of various lengths and diameters, and to provide variable speeds, in a machine of this type, for both the feeds of the grinding wheels and the surface speed of the wheels themselves.

Another and important object of the invention is to construct a machine for the above purpose, wherein the grinding unit may be readily adjusted both vertically and crosswise with respect to the roller, whereby the grinding wheels may be used to cut at a right angle to the surface of the roller and so as to position the grinding wheels at the side or on top of the roller; further to provide for angular adjustment of the grinding wheel shaft with relation to the axis of the roller shaft, whereby a larger grinding wheel may be used upon the shaft at one end and a smaller wheel upon the other in a manner to produce different surface cutting speeds with the same speed of the shaft; further to provide for adjustment of the grinding wheels whereby the same may be positioned to run with or against the rotary movement of the roller to be ground, or to operate upon the surface of the roller in line with the axis of the roller and at a right or acute angle to the direction of rotation of the roller.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings, forming a part of this specification, and upon which Fig. 1 shows a front elevation view of my improved rubber roller grinding machine having a rubber roller mounted therein to be ground;

Fig. 2 shows a front and end view respectively of the adjustable bearing carried by the head stock on the left end portion of the bed of the machine for the support of the one end of the rubber roller;

Fig. 3 shows an end view, as seen from arrow "a", of the adjustable bearing carried by the tail stock mounted on the right end of the machine, as shown in Fig. 1, for the support of the other end of the rubber roller;

Fig. 4 shows a plan view of the machine, as illustrated in Fig. 1, the roller being indicated in dotted lines;

Figs. 5, 6 and 7 show plan views of the carriage and the adjustable grinding wheels mounted thereon in the different positions in which said wheels may be positioned for various surface grinding operations;

Fig. 8 shows an enlarged cross-sectional view of the machine through the bed, carriage and adjustable grinder support, taken on line 8—8 of Fig. 1;

Fig. 9 is a further cross-sectional view through the bed of the machine, taken on line 9—9 of Fig. 1, the said carriage being shown in side elevation;

Fig. 10 is a sectional plan view of the adjustable bracket and motor frame and base plate for adjustable mounting on the carriage;

Fig. 11 is an enlarged sectional elevational view of the change speed gearing shown at the left end of the machine, Fig. 1;

Fig. 12 is a similar enlarged vertical sectional view taken on line 12—12 of Fig. 11;

Fig. 13 is a sectional plan view on a similarly enlarged scale of the change speed gear mechanism shown in Figs. 11 and 12, said section being taken on line 13—13 of Fig. 11;

Fig. 14 shows a vertical section through the apron of the carriage and change speed gearing contained therein, taken on line 14—14 of Fig. 8; and Fig. 15 shows a horizontal sectional view of apron and change speed gear mechanism taken on line 15—15 of Fig. 14.

Referring in detail to the characters of reference marked upon the drawing 20—20 indicate pedestals upon which the bed 21 of the machine is mounted. This bed is of an elongated shape, somewhat like an ordinary lathe bed, and includes three longitudinal inverted V-shaped tracks 22, 23 and 24, the first mentioned track being on the top side of the rear portion of the bed and the two last mentioned being upon the wider front top side of the bed, said tracks serving to support and guide the carriage 25 movably mounted thereon. This carriage is provided with a plate 26 upon the under side of the rear portion and a plate 27 upon the under side of the central portion, the edge portions of the said plates being slightly extended for slidable engagement with the under face of the top portions of the bed so as to support and retain the carriage in slidable engagement upon the bed.

A long rack 28 is secured to the under side of the front top portion of the bed for engagement by gear 29 driven by the change speed gear mechanism, the latter to be more fully described, and located within the apron 30 of the carriage 25. See Figs. 8, 14 and 15. Bearing brackets 31 and 32 are secured to the front side of the bed of the machine, and serve to operatably support the splined feed shaft 33 that extends through the apron for operating the change speed gear mechanism carried therein. This splined shaft is also journaled in bearings of the housing 34, secured to the end of the bed, for driving the change speed gear mechanism, and whereby the carriage may be operated at different speeds. This splined shaft is connected to be driven by this change speed gear mechanism through change gears 35, 36, 37 and 38 contained within a pocket 39 of the housing and connected to be operated through the change speed gear mechanism contained within said housing.

The opposite end portions of a longitudinal rod 40 are secured within the before mentioned brackets 31 and 32 and are provided with collars 41 upon each end portion, which collars may be adjustably secured in various positions on said rod for engagement by a trip device 150 for disconnecting the feed gearing within the apron and stopping the movement of the carriage, as will again be referred to.

Referring to Fig. 1, 42 represents an elongated rubber roller such as my machine is adapted to grind. This roller is mounted upon tubular iron core or mandrel 43, the ends of which project from the opposite ends of the roller and serve as pintles for the rotatable support of the roller. This roller is preferably rotated in an opposite direction from that of the grinding wheels, and its pintle at one end is connected as at 45 to be driven through a flexible shaft 44. The other end of said flexible shaft is operatably connected as at 46, see also Fig. 11, with a driven shaft 47 of the gear train in the before mentioned housing 34, as will later be described.

It is important that the rubber roller be accurately positioned on the machine and in perfect alignment with the surface of the bed and the line of travel of the carriage upon the bed so as to insure a uniform though very delicate operative engagement of the grinding wheels with the surface of the roller to be ground. To accomplish this, I have provided brackets in the form of a head stock 48 upon one end portion of the bed and a tail stock 49 on the opposite end portion of the bed, both of which are adjustably mounted by means of screws 50 and whereby they may be adjusted longitudinally upon the bed. Screws 50 engage clamping plates 51, like 27 as shown in Figs. 8 and 9, that engage the under face of the top portion of the bed, thus providing means for moving the brackets longitudinally upon the bed, better to accommodate rollers of different lengths.

Upon the forward end of each of these brackets 48 and 49 is provided an adjustable bearing for supporting the pintle end of the roller. The bearing 52 carried by the bracket 48 is adapted for crosswise adjustment, while the bearing 53 upon the bracket 49 is designed for vertical adjustment. By this means of adjustment, one end of the roller can be adjusted in one direction and the other end at a right angle with respect thereto. It can thus readily be understood that a true longitudinal positioning of the roller with respect to the surface of the bed in this manner is made possible. The bearing 52, as shown in Figs. 1 and 4, is also shown in larger views in Fig. 2 and as will be seen, includes a lower bearing member 54 that is provided with horizontal dovetails 55 slidably mounted on corresponding ways 56 formed on the end of the head stock. An adjusting screw 57 is mounted in the head stock 48 and is provided with an annular groove in which is positioned the end portion of a plate 58 carried by the bearing member 56, so that with the turning and running in and out of the screw the bearing member is moved crosswise with respect to the head stock 48. The bearing further includes an upper bearing member 59 that is hingedly connected to the lower bearing member, as at 60, and is adapted to be opened up, as shown in dotted lines, for the removal of the roller spindle, and is provided with a screw 61 for securing it in a closed position, as shown in Fig. 2.

The adjustable bearing 53 serves to provide vertical adjustment, in which case the ways upon the end of the tail stock 49 are disposed vertically to accommodate the vertical dovetail in the lower bearing member 62. An adjusting screw 63 is positioned in the under side of the end of the tail stock 49 and includes an annular groove to receive the end of the plate 64 which serves to insure vertical movements of the bearing member with respect to the end of the tail stock when the screw mounted therein is turned. The cover member 65 of this bearing 53 is substantially like that shown in Fig. 2, being hinged at 66 to the lower bearing member 62, and adapted to be opened and closed, and secured in its closed position by means of a set screw 67. By this arrangement, and as before suggested, I have provided for the operative support of rollers of different lengths and for the adjustment of the bearing for one end in a horizontal direction and the adjustment of the bearing for the other end in a vertical direction, whereby a true alignment of the axis of the roller may be obtained with respect to the surface of the bed upon which the brackets 48 and 49 and roller are mounted.

The top side of the carriage 25 is provided with guideways 68 upon which a base plate 69 is adjustably mounted. The plate includes a depending integral threaded stud 70 that extends down through an elongated opening in the top of the carriage. The threaded end of a screw 71 engages the stud in a manner to move it and the plate back and forth upon the ways of the carriage and crossways of the machine. The outer end of this screw is journaled in a disk 72 that is secured in the side of the apron. An operating handle 73 carrying a disk 74 is mounted upon the outer end portion of this screw and is adapted to be used for turning the screw and the disk 74 with respect to the fixed disk 72. The peripheral surfaces of these disks are provided with graduations adapted to be read with respect to each other and whereby to determine the amount of adjustment and positioning of the plate 69. A motor bracket is swivelly mounted on this plate and includes an upright 75 and a base 76 having a central hole 77 therethrough and a finished annular edge portion 78. The hole in the base serves to accommodate a pivot screw 79 upon which the bracket is adapted to turn in the rotatable adjustment of the same and its grinding wheels 80 and 81 with respect to the rubber roller 42 to be ground.

A series of clamps 82 are provided for engagement with the annular edge portion of the base of the bracket which is adapted to be secured in its adjusted position to the base-plate 69 by means of clamping screws 83 threaded to engage the said plate 69 and for tightening the clamps down upon the base of the bracket after the same has been adjusted.

An adjusting screw 84 is mounted in the upper end portion 85 of the upright 75 and is provided with a handle 86 for turning the same. The lower end of this screw engages a threaded stud 87 projected from an adjustable motor frame 88 that is mounted in ways 89 of the upright, and whereby the support and its motor and grinding wheels may be adjusted vertically by the turning of the screw. This support serves to carry the electric motor, upon the spindle of which are mounted the said grinding wheels, as shown in the drawing, though it will be obvious that but one wheel may be used, if preferred, instead of the pair as shown.

90 represents a motor which is preferably positioned beneath the under side of one end portion of the bed and is connected by means of a belt 91 with a pulley 92 on a drive shaft 93 journaled within the housing 34.

The housing 34 is formed in two parts, secured together by screws 94, and is designed to enclose the gear train contained therein. The drive shaft 93 is provided with roller bearings 95 secured within the housing, and carries a spiral gear 96 which meshes with and drives a second spiral gear 97 that forms one of two gears, keyed to slide upon a shaft 98 mounted at right angles and above the driven shaft 93. The second gear 99 of the pair is positioned in spaced relation to the spiral gear 97 on a sleeve 100 that is splined to slide on the shaft 98. This gear train or line of drive is provided for the several high speeds utilized in the polishing of the rubber roller.

A vertically projected arm 101 is mounted to swing upon a hub 102 of the gear 103 mounted on shaft 98 and is held against sidewise movement on the sleeve by a collar 104 secured to the hub, thus leaving the gear and arm free for slidable movement upon the shaft 98 and the arm free to swing upon the before mentioned hub. This arm serves to carry an idle gear 105, mounted on a short stud 161 carried by the arm, and which is in constant engagement with the gear 103, though is adapted to engage with either of the four cone gears 106 of different diameters, keyed to the shaft 47, journaled in ball bearings 107 mounted in the housing. This gear train obviously serves to drive the aforesaid shaft 47 at any one of four different speeds.

The gear shifting mechanism for this change speed gearing is connected with the outer end of the before mentioned arm 101, see Fig. 2, and includes a rocker shaft 108, bearing an operating arm 112. The two ends of this shaft are journaled in the gear housing and carry an arm 109 upon the free end of which is mounted a swivel block 110 that is slidably mounted in a slot 111 in the upper end of the before mentioned arm 101 so that the arm 109 and the arm 101 will be swung by a rocker movement of the before mentioned rocker shaft 108.

The crooked operating arm 112 carries a spring actuated detent pin 113 in its outer end, that is adapted for engagement with either of the four holes 114 of the cylindrical extension 115 as the arm is shifted over the cammed edge for different positions of said arm with respect to the cylinder. By this operating the rocker shaft is not only turned but is moved longitudinally so that the sliding gear 103 together with the arm 101 and idler gear 105 carried thereon, are shifted longitudinally upon the shaft 98 for engagement with either of the cone gears 106.

The gear box 34 also includes a further change speed drive mechanism which provides four distinct slow speeds, which may be used independently of the high speeds; the high and low speed gearings are used separately, though in part comprise some of the same driving means. These slow speeds are more particularly designed for the grinding operations, while the high speeds are used exclusively for polishing the rubber rollers after being ground.

Upon the drive shaft 93 is mounted a worm 116 which meshes with and drives a worm gear 117 on a shaft 118 journaled in bearings 119. 120 represents a spur gear secured to shaft 118 and adapted to drive the slidable spur gear 99 on shaft 98 when said sliding gear is brought into mesh therewith. This sliding gear 99 is formed integral with the spiral gear 97 and with it is keyed to slide on the said shaft 98 it being understood that when the spur gear 99 is being driven by the gear 120 the spiral gear 97 is out of driving engagement with the spiral gear 96, and that the said shaft 98 is then being driven through a different ratio of gearing from what would be the case if driven, not through the gear 99, but through the spiral gear 96 on shaft 93.

In order to obtain four different speeds of the feed shaft 33, I provide means for driving the same through the four change gears 106, shaft 47, gear 47$^a$ mounted on said shaft and thence through gear 47$^b$ slidably mounted on and keyed to shaft 47$^c$, one end of which is journaled in the housing and the other end in bracket 119. This gear 47$^b$, as will be seen runs in the annular groove 124 and being free to slide upon the shaft 47$^c$, is adapted to move thereon with the movement of the connected gears 97 and 99 so as to connect and disconnect it with the before mentioned gear 47$^a$. When thus connected, the drive for feed shaft 33 is through the gears 47ª and 47ᵇ on shaft 47ᶜ carrying the before mentioned gear 35.

It will be noted that the feed shaft is thus driven only when the roller is being driven at slow speed through gears 120 and 99. My improved change gear mechanism herein described and contained within the housing 34 enables me to maintain the same feed for the grinding wheels per revolution of the rollers, thus producing the same cut on all rollers regardless of size and irrespective of their speed.

The combined slidable gears 97 and 99 are adapted to be shifted from one driving gear 117 to the other 120 or to an intermediate disengaged neutral position by means of lever 121 mounted upon a rocker shaft 122 and carrying a swivelly connected shoe 123 that rides in the annular groove 124 between the two gears 97 and 99. An operating arm 125 is mounted upon the outer end of the rocker shaft 122 and is provided with a detent pin 126 for engaging one of a series of holes 127 in the side of the gear box, and whereby the sliding gears can be shifted to either of their three positions and held until manually released.

The carriage 25 includes an apron 30 which is in the form of a gear box and moves longitudinally of the bed for feeding operations. The gear mechanism within this apron, see Figs. 8, 14 and 15, is such as to provide two feeds for feeding the carriage. The feed shaft 33 is driven through the change speed mechanism in gear box 34, before described, and is mounted in bearing 32 on opposite end portions of the machine and extends through the apron. Upon this shaft, within the apron, is mounted double gears 128 and 129. The latter gear connects with and drives a relatively large gear 130 loosely mounted upon a shaft 131 and is provided with a clutch face 132 for engagement by a clutch member 133 that is keyed to the shaft and adapted to be engaged and disengaged not only with the clutch of the gear 130 but also with the clutch face of the gear 134 which is likewise free upon the shaft 131.

Adjacent to the gear 134 and upon the shaft 131 is secured a gear 135 that meshes with and drives a gear 136 and sleeve 137 carrying a larger gear 138 and a spool 139 slidably mounted on a shaft 140 journaled in bearings 141 and carrying a beveled gear 142 upon its end portion. The forward and reverse drive is obtained through movement of the clutch 133, and the high speed through the gear connections 135 and 136, and the low speed through gear connections 138 and 143. The gears 136 and 138, together with their sleeve and spool, are adapted to be slid horizontally upon the shaft 140 for engagement with either the gear 135 or 143 and whereby the different speeds of drive for the shaft 140 are obtained. The spool upon the shaft 140 is operated through the manipulation of a handle 144 mounted upon a rocker shaft 145, see Fig. 8, journaled in the apron, and bearing an arm 146 within the housing, carrying forks that engage the spool 139 in an operative way to shift the same by the operation of the lever.

A somewhat similar means is provided for automatically shifting the clutch member 133, which comprises an arm 147 carrying a fork that engages the annular groove in the slidable clutch member 133, said arm being mounted on a rocker shaft 148 journaled in the apron, and bearing an arm 149 upon the outside of the apron. This arm is connected for automatic operation through a lever 150 pivoted at 151 and having its other end in slidable engagement with a fixed rod 40 secured in brackets and carrying adjustable collars 41 upon its two end portions, and whereby as the carriage moves and approaches the end of its travel the free end of the lever 150 will engage a collar in a way to operate the lever and automatically shift the clutch to disengage the drive and thereby stop the travel of the carriage presumably at the finish of the grinding operation. By reason of the adjustability of the collars on the rod 40, provision is made for shorter travels of the carriage as may be necessary when grinding short rollers.

The gear 128 on shaft 33 connects with and drives an idler 152 that runs free upon a shaft 153 though is held against longitudinal movement upon the shaft by collars 154. This idler in turn serves to drive the before mentioned clutch gear 134 journaled upon the shaft 131 and subject to be engaged and disengaged by the clutch member 133.

The beveled gear 142 before mentioned meshes with and is adapted to operate a smaller beveled gear 155 upon a shaft 156 journaled in the casing. This shaft carries a large gear 157 that meshes with and is adapted to be operated through a pinion 158 carried upon shaft 159 journaled in the apron and having a hand wheel 160 secured upon its outer end. This line of connections is obviously for the purpose of hand operation, in which case the clutch 133 would be disengaged and the hand operation of the carriage effected through the engagement of the pinion 29 upon the shaft 156 with the rack 28 secured to the bed. This gear train is also operated during the automatic or power drive of the carriage, said power being applied through the shaft 156, pinion 29 and rack, it being obvious of course that during said drive the gears 157 and 158 and hand wheel 160 run idly. By this means we feed the carriage backward or forward with either a slow or fast speed.

By the operations of the hand levers we can stop the carriage at any time in any position. We can thereafter adjust the carriage by hand, if desired, in either direction and then again throw into power for automatic feeding. As before explained, automatic means of stopping the carriage in any position, and when moving in either direction, is provided.

A high speed motor is used on this machine and preferably relatively large grinding wheels so as to obtain a maximum surface speed of the wheel upon the work which does not require to be varied to any material extent. In this connection, however, it will be noted that for some classes of work it is desirable to use wheels of different diameters specially positioned and arranged in relation to each other as well as the work to be ground.

It will be observed from the several illustrations herein, that the motor and its cutting wheels may be adjusted both vertically and horizontally so as to bring the wheels to the rear of the roller or directly above the center, and at any angle desired, with respect to the roller center. This provides a material advantage, in being able to crown a roller to any extent desired. This crowning is best accomplished by positioning the grinding wheels at a position above that shown in Fig. 8, the horizontal center line of the roller; whereas if you want to produce a roller having a perfectly uniform diameter and an absolutely straight longitudinal surface, the wheels would be positioned on a line horizontal with the axis of the roller as indicated in Fig. 8, the relative amount of said lower positioning being determined by the natural sag in the roller when supported at its two ends as positioned in the machine.

In Figs. 4, 5, 6 and 7 I illustrate four different methods of roller grinding, for instance, in Fig. 4, which corresponds with the positions shown in Figs. 1 and 8, the spindle, for the grinding wheels, being set parallel to the axis of the rubber roller 42 to be ground, the two wheels, being mounted upon the same spindle in this case, are driven at the same rate of speed and provide similar peripheral speeds, though when operating in this way the forward grinding wheel 80 may be a coarse wheel and the other a fine one, so as to provide a preliminary roughing cut on the roller, while the other wheel upon the rear could be a finer wheel for a finishing cut.

By reason of the adjustable mounting motor bracket, it is susceptible of being turned upon the center 79, which permits the shaft for the grinding wheels to be shifted to various angular positions with respect to the axis of the roller. This permits of the mounting of a larger grinding wheel on the forward end of the motor shaft than upon the rear end, see Fig. 7, and by the beveling of the periphery of these wheels, aligned grinding surfaces of the two wheels is provided for the surface of the roller, yet the forward, larger roughing wheel produces a very much faster peripheral speed than is produced with the rear wheel making the finishing cut. In some instances, it may be desirable to reverse the order of this operation which can be easily done with this machine by putting the smaller wheel in front and the larger wheel on the rear end of the shaft.

In the illustration shown in Fig. 6, the motor shaft and wheels are raised and adjusted so that but one of the cutting wheels is used and that positioned immediately above the rubber roller and aligned to operate at an angle of 90 degrees with respect to the roller, while in Fig. 6 the wheels are adjusted to operate on top of the roller and longitudinally therewith, and at a right angle to the rotary movement of the roller. This form of grinding may be used both for rough or finish grinding, and one wheel only would be used at a time in this case.

Having thus described my invention, what I claim and desire to secure by Letters Patent is:

1. In a roller grinding machine, a bed, a head stock and a tail stock mounted thereon having bearings to support the pintle ends of a roller to be ground, means for rotating the roller, a reciprocatory carriage mounted upon the bed, means for feeding the carriage longitudinally of the bed, an electric motor, grinding wheels of different diameters mounted upon opposite end portions of the motor spindle, means for adjusting the motor and wheels both vertically and horizontally with respect to the axis of a roller to position the grinding wheels against and at various angles with respect to the surface of the roller.

2. In a roller grinding machine, a bed, means for supporting a roller thereon to be ground, means for rotating the roller, a reciprocatory carriage mounted on the bed, means for feeding the carriage horizontally of the bed, an electric motor, grinding wheels of different diameters mounted on opposite end portions of the motor spindle, means for adjusting the motor and its spindles to position the two grinding wheels to operate simultaneously against the top side and at an angle to the axis of the roller to provide two different cutting speeds on the surface of said roller.

3. In a roller grinding machine, a bed, means for supporting a roller to be ground, means for rotating the roller, a reciprocatory carriage mounted upon the bed, means for feeding the carriage longitudinally of the bed, an electric motor, grinding wheels of different diameters mounted upon opposite end portions of the motor spindle, means for positioning against said wheels the surface of a roller in a way to provide a different surface speed of one grinding wheel upon the roller than that of the other.

LESLIE W. BARNES.